(12) United States Patent
Yamada et al.

(10) Patent No.: US 8,749,632 B2
(45) Date of Patent: Jun. 10, 2014

(54) IMAGE GENERATION APPARATUS

(75) Inventors: Masahiro Yamada, Kobe (JP); Azusa Matsuoka, Kobe (JP); Susumu Taniguchi, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 344 days.

(21) Appl. No.: 13/048,326

(22) Filed: Mar. 15, 2011

(65) Prior Publication Data
US 2011/0242320 A1 Oct. 6, 2011

(30) Foreign Application Priority Data
Mar. 31, 2010 (JP) .................. 2010-080716

(51) Int. Cl.
*H04N 7/18* (2006.01)
*B60Q 1/00* (2006.01)

(52) U.S. Cl.
USPC ............ 348/148; 348/153; 348/159; 340/435

(58) Field of Classification Search
None
See application file for complete search history.

(56) References Cited

U.S. PATENT DOCUMENTS

| | | | |
|---|---|---|---|
| 7,663,476 B2 | 2/2010 | Watanabe et al. | |
| 8,452,056 B2 | 5/2013 | Muramatsu et al. | |
| 2004/0114796 A1 | 6/2004 | Kaku | |
| 2006/0033820 A1* | 2/2006 | Honda et al. | 348/218.1 |
| 2006/0088190 A1 | 4/2006 | Chinomi | |
| 2007/0268118 A1* | 11/2007 | Watanabe et al. | 340/435 |
| 2009/0009604 A1* | 1/2009 | Kanaoka et al. | 348/148 |
| 2009/0273941 A1* | 11/2009 | Englander et al. | 362/464 |
| 2011/0285848 A1 | 11/2011 | Han et al. | |

FOREIGN PATENT DOCUMENTS

| | | |
|---|---|---|
| JP | A-11-308609 | 11/1999 |
| JP | A-2002-240629 | 8/2002 |
| JP | A-2002-354468 | 12/2002 |
| JP | A-2006-121587 | 5/2006 |
| JP | A-2006-287513 | 10/2006 |
| JP | A-2007-036668 | 2/2007 |
| JP | A-2008-195258 | 8/2008 |
| JP | A-2008-306546 | 12/2008 |
| JP | A-2009-141490 | 6/2009 |
| JP | A-2011-49735 | 3/2011 |

OTHER PUBLICATIONS

Mar. 1, 2013 Office Action issued in Chinese Patent Application No. 2011100381283 (with translation).
U.S. Appl. No. 13/032,946.
Aug. 21, 2013 Office Action in U.S. Appl. No. 13/032,946.
Japanese Office Action issued in Japanese Patent Application No. 2010-080716 dated Nov. 19, 2013 (w/ partial translation).
Notice of Rejection issued in Japanese Patent Application No. 2010-070312 dated Jan. 7, 2014 (w/ partial translation).
Final Rejection issued in U.S. Appl. No. 13/032,946 dated Feb. 4, 2014.

* cited by examiner

*Primary Examiner* — Joseph Ustaris
*Assistant Examiner* — Maryam Nasri
(74) *Attorney, Agent, or Firm* — Oliff PLC

(57) ABSTRACT

An image display system makes a range of a region around a vehicle to be shown in a composite image as a subject image in a case where an auxiliary lighting system emits auxiliary light, smaller than that in a case where the auxiliary lighting system does not emit auxiliary light. As a result, an image display system can reduce the number of times when a user has to watch the subject image of an object in a region not illuminated by the auxiliary lighting system.

11 Claims, 13 Drawing Sheets

IMAGE GENERATION APPARATUS

BACKGROUND OF THE INVENTION

1. Field of the Invention

The invention relates to a technology that generates images to be displayed on a display apparatus installed in a vehicle.

2. Description of the Background Art

A conventionally-known image display system is of a type for installation in a vehicle, such as a car, to display images of the surroundings of the vehicle shot with a camera mounted on the vehicle, on an in-vehicle display. By using the image display system, a driver can understand the situation around the vehicle in substantially real time.

For example, a region outside a front fender of the vehicle, which is an opposite side to a driver seat, is often a blind spot for a driver. Therefore, it is difficult for the driver to understand a clearance between the vehicle body and an obstacle. On the other hand, when the image display system is used, an on-vehicle camera shoots images showing the region outside the front fender and the images are displayed on an in-vehicle display. As a result, the driver can easily see the clearance between the obstacle and the vehicle body in the region on the opposite side of the driver's seat, for example, when closely approaching a roadside.

In a dark surrounding environment, such as at night, there is a case where the images of the surroundings of the vehicle cannot be displayed with enough brightness because light exposure is insufficient for such an image display system to shoot images. Therefore, it is proposed to illuminate the region to be shot with the camera, by providing auxiliary light from an auxiliary light source for assisting in shooting images when the surrounding environment is relatively dark.

Recently, a new image display system is proposed that generates a composite image, showing the surroundings of the vehicle viewed from a virtual viewpoint such as a point directly above the vehicle by using a plurality of images of the surroundings of the vehicle shot with on-vehicle cameras and that displays the composite image on a display. Such an image display system allows a relatively broad range of the surroundings of the vehicle to be displayed on a display.

Even when this image display system is used, it is preferable to illuminate a surrounding area of the vehicle in a dark surrounding environment, in accordance with the relatively broad region able to be displayed. Although a lighting system such as headlights and taillights used for driving can illuminate a part of the region able to be displayed, it is preferable that an auxiliary light source illuminates the region that the lighting system for driving cannot illuminate.

However, since capabilities of the auxiliary light source installed on the vehicle is limited, it is difficult for the auxiliary light source, etc. to illuminate the entire region that can be displayed. Generally, only a part of the region able to be displayed is illuminated. Therefore, when the surrounding environment is dark, a composite image displayed by the image display system includes a dark region not illuminated by the auxiliary light source or the lighting system for driving. The visibility of a subject image of an object is extremely poor in such a dark region, compared to a subject image of an object in a region illuminated. When such a subject image having poor visibility is displayed on the display, a driver who should concentrate on driving the vehicle may gaze at the screen of the display to check the subject image.

SUMMARY OF THE INVENTION

According to one aspect of the invention, an image generation apparatus generates an image to be displayed on a display apparatus installed in a vehicle. The image generation apparatus includes: an image generator that generates a composite image viewed from a virtual viewpoint, on the basis of shot images acquired by shooting surroundings of the vehicle with a plurality of cameras; a lighting system that emits auxiliary light for assisting the plurality of cameras in shooting; and an image controller that, in a case where the lighting system emits the auxiliary light, makes an image display range that is a range of a region around the vehicle to be shown in the composite image, smaller than the image display range in a case where the lighting system does not emit the auxiliary light.

In the case where the lighting system emits the auxiliary light, the image generation apparatus makes the image display range smaller than the image display range in the case where the lighting system does not emit the auxiliary light. Accordingly, a region not illuminated by the lighting system is reduced in the image display range. As a result, the number of times when the user has to watch the subject image having poor visibility can be reduced.

According to another aspect of the invention, the image controller sets the image display range on the basis of a range that the lighting system is capable of illuminating in the case where the lighting system emits the auxiliary light.

A range which is bright enough to identify the subject image can be set as the image display range. Accordingly, visibility of the subject image to be shown in the composite image can be improved.

According to another aspect of the invention, in the case where the lighting system emits the auxiliary light, the image controller makes a subject image shown in the composite image larger than the subject image in the case where the lighting system does not emit the auxiliary light.

In the case where the lighting system emits the auxiliary light, the subject image shown in the composite image is made larger than that in the case where the lighting system does not emit the auxiliary light. Accordingly, visibility of the subject image to be shown in the composite image can be improved.

Therefore, the object of the invention is to reduce the number of times when a user has to watch the subject image which has poor visibility.

These and other objects, features, aspects and advantages of the invention will become more apparent from the following detailed description of the invention when taken in conjunction with the accompanying drawings.

DESCRIPTION OF THE EMBODIMENTS

Hereinbelow, embodiments of this invention are described with reference to the drawings.

<1. First Embodiment>
<1-1. System Configuration>

Figure 1:
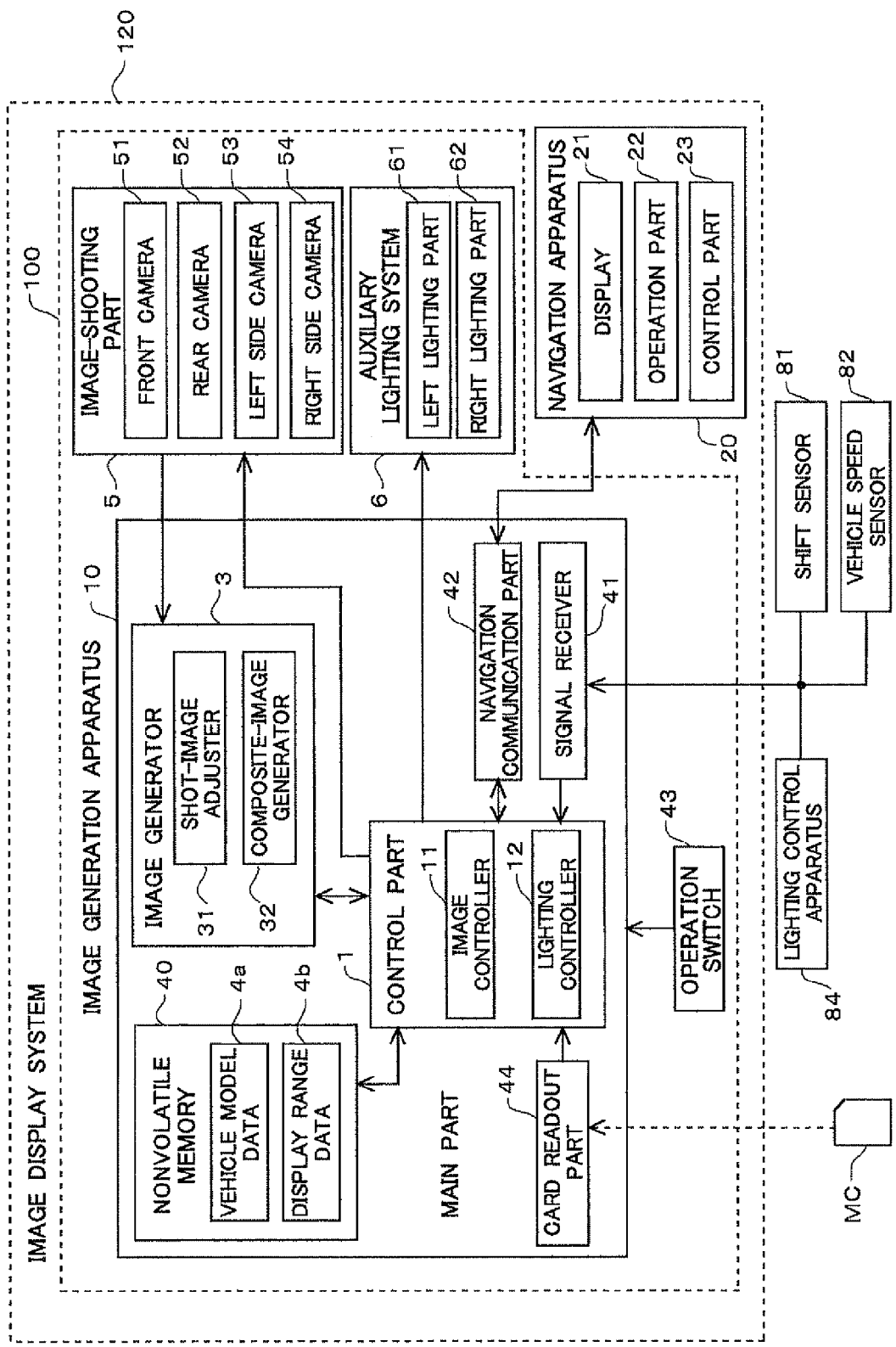
FIG. 1 is a block diagram showing a configuration of an image display system.

FIG. 1 shows a block diagram showing a configuration of an image display system 120 that is a first embodiment of this invention. The image display system 120 is for installation in a vehicle (a car in this embodiment) and has functions for generating an image by shooting surroundings of the vehicle and of displaying the image generated in a cabin of the vehicle. The image display system 120 allows a user of the image display system 120 (mainly a driver) to recognize a situation around the vehicle in substantially real time.

As shown in FIG. 1, the image display system 120 mainly includes an image generation apparatus 100 that generates an image showing the surroundings of the vehicle, and a navigation apparatus 20 that displays a variety of information for the user in the vehicle. The image generated by the image generation apparatus 100 is displayed on the navigation apparatus 20.

The navigation apparatus 20 provides navigation guidance for the user. The navigation apparatus 20 includes a display 21, such as a liquid crystal panel, having a touch-panel function, an operation part 22 with which the user operates the navigation apparatus 20, and a control part 23 that controls the whole navigation apparatus 20. The navigation apparatus 20 is disposed in/on an instrument panel, etc. of the vehicle in such a manner that a screen of the display 21 can be viewed by the user. Each of user commands is received by the operation part 22, or the display 21 serving as a touch panel. The control part 23 is a computer including, for example, a CPU, a RAM, a ROM, etc. Various functions of the control part 23 including a navigation function are implemented by arithmetic processing performed by the CPU in accordance with a predetermined program.

The navigation apparatus 20 is communicably connected to the image generation apparatus 100. Therefore, the navigation apparatus 20 can transmit and receive various control signals to/from the image generation apparatus 100, and can receive an image generated by the image generation apparatus 100. The display 21 normally displays an image based on a function only of the navigation apparatus 20 under control of the control part 23. However, under a predetermined condition, the image is displayed that is generated in the image generation apparatus 100 and that shows the surroundings of the vehicle. Therefore, the navigation apparatus 20 functions also as a display apparatus that receives and displays the image generated by the image generation apparatus 100.

The image generation apparatus 100 includes a main part 10 that is an ECU (Electronic Control Unit) having a function of generating an image. The main part 10 is disposed at a predetermined location in the vehicle. The image generation apparatus 100 includes an image-shooting part 5 that shoots the surroundings of the vehicle. The image generation apparatus 100 generates a composite image viewed from a virtual viewpoint based on shot images acquired by the image-shooting part 5 by shooting the surroundings of the vehicle.

The image-shooting part 5 is electrically connected to the main part 10 and functions in accordance with a signal from the main part 10. The image-shooting part 5 includes a front camera 51, a rear camera 52, a left side camera 53 and a right side camera 54 all of which are on-vehicle cameras. Each of the on-vehicle cameras 51, 52, 53 and 54 includes a lens and an image sensor, and shoots an image electronically. Moreover, each of the on-vehicle cameras 51, 52, 53 and 54 implements an exposure control to ensure appropriate brightness of a subject image in a shot image.

Figure 2:
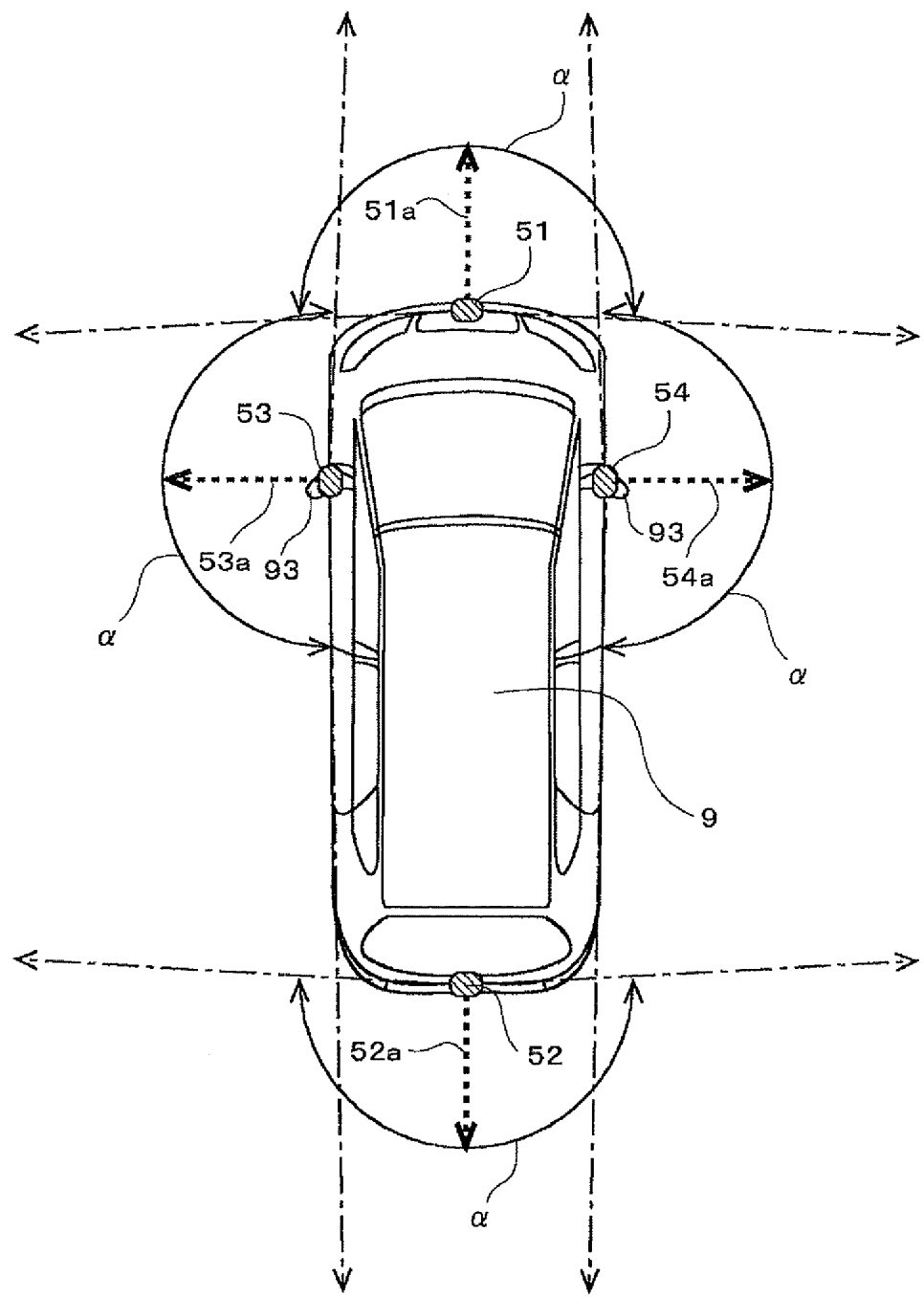
FIG. 2 shows locations of on-vehicle cameras disposed on a vehicle.

These on-vehicle cameras 51, 52, 53 and 54 are respectively disposed at different locations on the vehicle. FIG. 2 shows exemplary locations where the on-vehicle cameras 51, 52, 53 and 54 are disposed on a vehicle 9.

As shown in FIG. 2, the front camera 51 is disposed at a location near a license plate at a front end of the vehicle 9 and an optical axis 51a of the front camera 51 is directed in a straightly forward direction in which the vehicle 9 travels. The rear camera 52 is disposed at a location near a license plate at a rear end of the vehicle 9, and an optical axis 52a of the rear camera 52 is directed in a direction opposite to the direction in which the vehicle 9 travels. It is preferable that the front camera 51 and the rear camera 52 are respectively disposed at a front center and at a rear center between a right edge and a left edge of the vehicle 9. However, the front camera 51 and/or the rear camera 52 may be disposed at a location slightly right or left from the center.

The left side camera 53 is disposed on a side mirror 93 on a left side of the vehicle 9, and an optical axis 53a of the left side camera 53 is directed in a left direction (a direction perpendicular to the forward direction in which the vehicle 9 travels) along a left-right axis of the vehicle 9. The right side camera 54 is disposed on a side mirror 93 on a right side of the vehicle 9, and an optical axis 54a of the right side camera 54 is directed in a right direction along the left-right axis of the vehicle 9.

Since each of these on-vehicle cameras 51, 52, 53 and 54 is equipped with, e.g., a fish-eye lens, each of the on-vehicle cameras 51, 52, 53 and 54 has an angle of view a of 180 degrees or more. Therefore, the surroundings entirely around the vehicle 9 can be shot by using the four on-vehicle cameras.

Referring back to FIG. 1, the image generation apparatus 100 further includes an auxiliary lighting system 6 that emits auxiliary light for assisting the image-shooting part 5 in shooting an image. When the surrounding environment is dark, e.g., at night, the subject image shown in the shot image acquired by the image-shooting part 5 is not bright enough because a light exposure is not sufficient to shoot the image. Therefore, the auxiliary lighting system 6 emits the auxiliary light to illuminate a region around the vehicle. The auxiliary lighting system 6 includes a left lighting part 61 that illuminates a left lateral region outside the vehicle and a tight lighting part 62 that illuminates a right lateral region outside the vehicle 9. Concrete regions that the left lighting part 61 and the right lighting part 62 are capable of illuminating will be described later.

The main part 10 of the image generation apparatus 100 mainly includes a control part 1 that controls the whole image generation apparatus 100, an image generator 3 that generates an image for display by processing of the shot image acquired with the image-shooting part 5, and a navigation communication part 42 that communicates with the navigation apparatus 20.

Each of the user commands received by the operation part 22 or the display 21 of the navigation apparatus 20 is received as a control signal by the navigation communication part 42 and is input into the control part 1. Moreover, the image generation apparatus 100 includes an operation switch 43 that receives a user command relating to image display, directly from the user. A signal indicative of the user command is also input into the control part 1 from the operation switch 43. As a result, the image generation apparatus 100 is capable of functioning in response to a user operation made with the navigation apparatus 20 or with the operation switch 43. The operation switch 43 is disposed at an appropriate location in the vehicle, separately from the main part 10 for easy operation by the user.

The image generator 3 is, for example, a hardware circuitry capable of a variety of image processing, and includes a shot-image adjuster 31 and a composite-image generator 32 as main functions.

The shot-image adjuster 31 adjusts the shot image acquired by the image-shooting part 5, for display. Concretely, the shot-image adjuster 31 performs the image processing such as correction of distortion, scaling, clipping, etc. of the shot image.

Based on a plurality of the shot images acquired with the on-vehicle cameras 51, 52, 53 and 54 of the image-shooting part 5, the composite-image generator 32 generates a composite image showing at least a part of the region around the vehicle viewed from an arbitrary virtual viewpoint around or over the vehicle. A method where the composite-image generator 32 generates the composite image will be described later.

The shot images adjusted by the shot-image adjuster 31 and the composite image generated by the composite-image generator 32 are further adjusted to be an image for display. Then, the image for display is output to the navigation apparatus 20 by the navigation communication part 42. As a result, the image showing the region around the vehicle is displayed as a subject image on the display 21 of the navigation apparatus 20.

The control part 1 is a computer including, for example, a CPU, a RAM, a ROM, etc. Various control functions of the control part 1 are implemented by arithmetic processing performed by the CPU in accordance with a predetermined program. An image controller 11 and a lighting controller 12 shown in the drawing represent a part of the functions implemented by the control part 1 in such a manner.

The image controller 11 controls the image processing performed by the image generator 3. For example, the image controller 11 specifies various parameters required for generation of the composite image by the composite-image generator 32. A range of the region around the vehicle to be shown as the subject image in the composite image is changed by the image controller 11.

The lighting controller 12 controls illumination by the auxiliary lighting system 6. The lighting controller 12 emits the auxiliary light from the auxiliary lighting system 6, when surroundings of the vehicle are dark, to display an image of the surroundings of the vehicle on the display 21.

Moreover, the main part 10 of the image generation apparatus 100 further includes a nonvolatile memory 40, a card readout part 44, and a signal receiver 41, all of which are connected to the control part 1.

An example of the nonvolatile memory 40 is a flash memory capable of retaining a stored content even when power is not supplied. A vehicle model data 4a and a display range data 4b, etc. are stored in the nonvolatile memory 40. The vehicle model data 4a is data that corresponds to the model of the vehicle and that is required for generation of the composite image by the composite-image generator 32. Moreover, the display range data 4b is data that the image controller 11 refers to in determining a range of the region around the vehicle to be shown as the subject image in the composite image.

The card readout part 44 reads out a memory card MC that is a portable recording medium. The card readout part 44 includes a memory card slot into/from which the memory card MC can be inserted and removed, and reads out data stored in the memory card MC in the memory card slot. The data being read out by the card readout part 44 is input into the control part 1.

The memory card MC includes a flash memory, etc. capable of storing a variety of data. The image generation apparatus 100 is capable of using the variety of data stored in the memory card MC. For example, readout of a program stored in the memory card MC allows a program (firmware) for implementing a function of the control part 1 to be updated. Moreover, it is possible to store, into the memory card MC, vehicle model data for a vehicle model other than the vehicle model data 4a stored in the nonvolatile memory 40. The image display system 120 can be changed to accommodate to the vehicle model by reading out the vehicle model data stored in the memory card MC and by storing the vehicle model data being read out into the nonvolatile memory 40.

The signal receiver 41 receives signals from various apparatuses installed in the vehicle. A signal from an outside of the image display system 120 is input into the control part 1 via the signal receiver 41. Concretely, the signal receiver 41 receives the signals indicative of a variety of information transmitted from a shift sensor 81, a vehicle speed sensor 82, a lighting control apparatus 84, etc., and inputs the signals received into the control part 1.

The shift sensor 81 transmits a signal indicative of a position, such as "P (Parking)," "D "Drive)," "N (Neutral)," and "R (Reverse)," of a shift lever that is a transmission of the vehicle. The vehicle speed sensor 82 transmits a signal indicative of a running speed (km/h) of the vehicle at a moment.

The lighting control apparatus 84 controls a lighting system such as headlights (headlamps) and taillights (tail lamps) used for normal driving of the vehicle. The lighting control apparatus 84 turns on headlights or taillights in response to a driver operation. The lighting control apparatus 84 transmits a signal indicative of an illuminating state of such a lighting system.

<1-2. Operation Mode>

Figure 3:
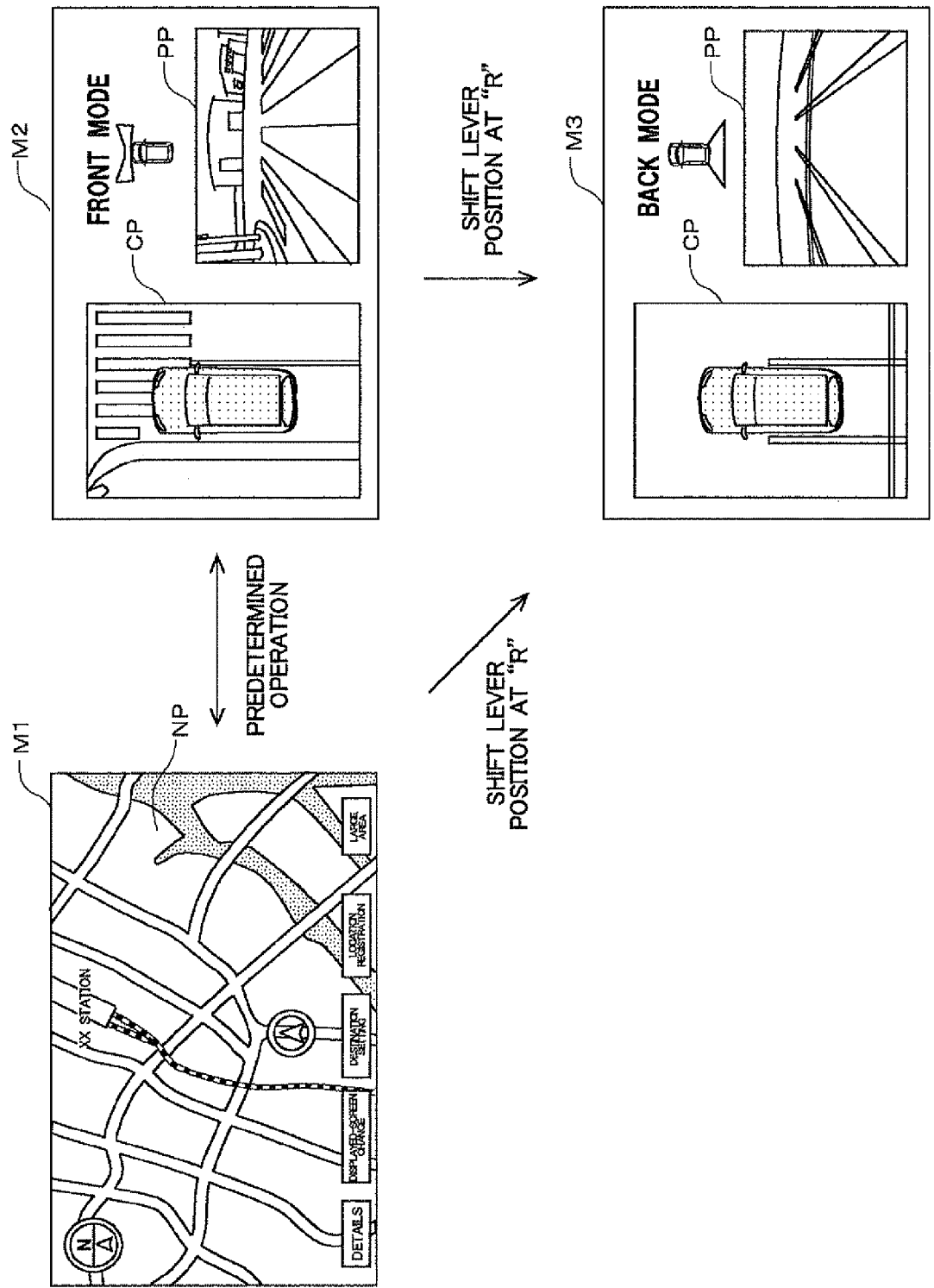
FIG. 3 shows changes of operation modes of the image display system.

Next, operation modes of the image display system 120 are explained. FIG. 3 shows changes of the operation modes of the image display system 120. The image display system 120 has three operation modes that are a navigation mode M1, a front mode M2 and a back mode M3. Each of these operation modes can be switched to another by control of the control part 1 in accordance with the driver operation or a driving state of the vehicle.

The navigation mode M1 is an operation mode in which a map image NP for the navigation guidance is mainly displayed on the display 21 by a function of the navigation apparatus 20. In the navigation mode M1, a variety of information is displayed by the function only of the navigation apparatus 20, without using a function of the image generation apparatus 100.

On the other hand, the front mode M2 and the back mode M3 are operation modes in which a situation around the vehicle is shown in real time to a user by displaying a shot image PP or a composite image CP on the display 21, using the function of the image generation apparatus 100.

The front mode M2 is an operation mode that displays an image mainly showing a region in front of and regions outside lateral sides of the vehicle, required for forward travel of the vehicle. In this embodiment, the display 21 simultaneously displays the shot image PP that is acquired with the front camera 51 and the composite image (downward view image) CP which shows the vehicle and the situation around the vehicle viewed from a virtual viewpoint directly above the vehicle.

The back mode M3 is an operation mode that displays mainly an image showing a region behind the vehicle, required when the vehicle moves backward. In this embodiment, the display 21 displays the shot image PP that is acquired with the rear camera 52 along with the composite image (downward view image) CP that shows the vehicle and the situation around the vehicle viewed from a virtual viewpoint directly above the vehicle. In the front mode M2 or in the back mode M3, the composite image (downward view image) CP viewed from a virtual viewpoint directly above the vehicle is displayed.

When a predetermined operation is performed to the operation part 22 of the navigation apparatus 20 in the navigation mode M1, the operation mode is switched to the front mode M2. Moreover, when a predetermined operation is performed to the operation part 22 of the navigation apparatus 20 in the front mode M2, the operation mode is switched to the navigation mode M1. The navigation mode M1 may be switched to/from the front mode M2 in accordance with a running speed of the vehicle represented by a signal transmitted from the vehicle speed sensor 82.

When a shift lever position represented by a signal transmitted from the shift sensor 81 is changed to the position "R (Reverse)" in the navigation mode M1 or in the front mode M2, the operation mode is switched to the back mode M3. In other words, since the shift lever in the position "R (Reverse)" means that the vehicle is in a state of moving backward, the operation mode is switched to the back mode M3 for showing mainly the region behind the vehicle. When the shift lever is changed to a position other than the position "R (Reverse)" in the back mode M3, the back mode M3 is switched back to an operation mode immediately preceding the back mode M3.

<1-3. Generation of Composite Image>

Figure 4:
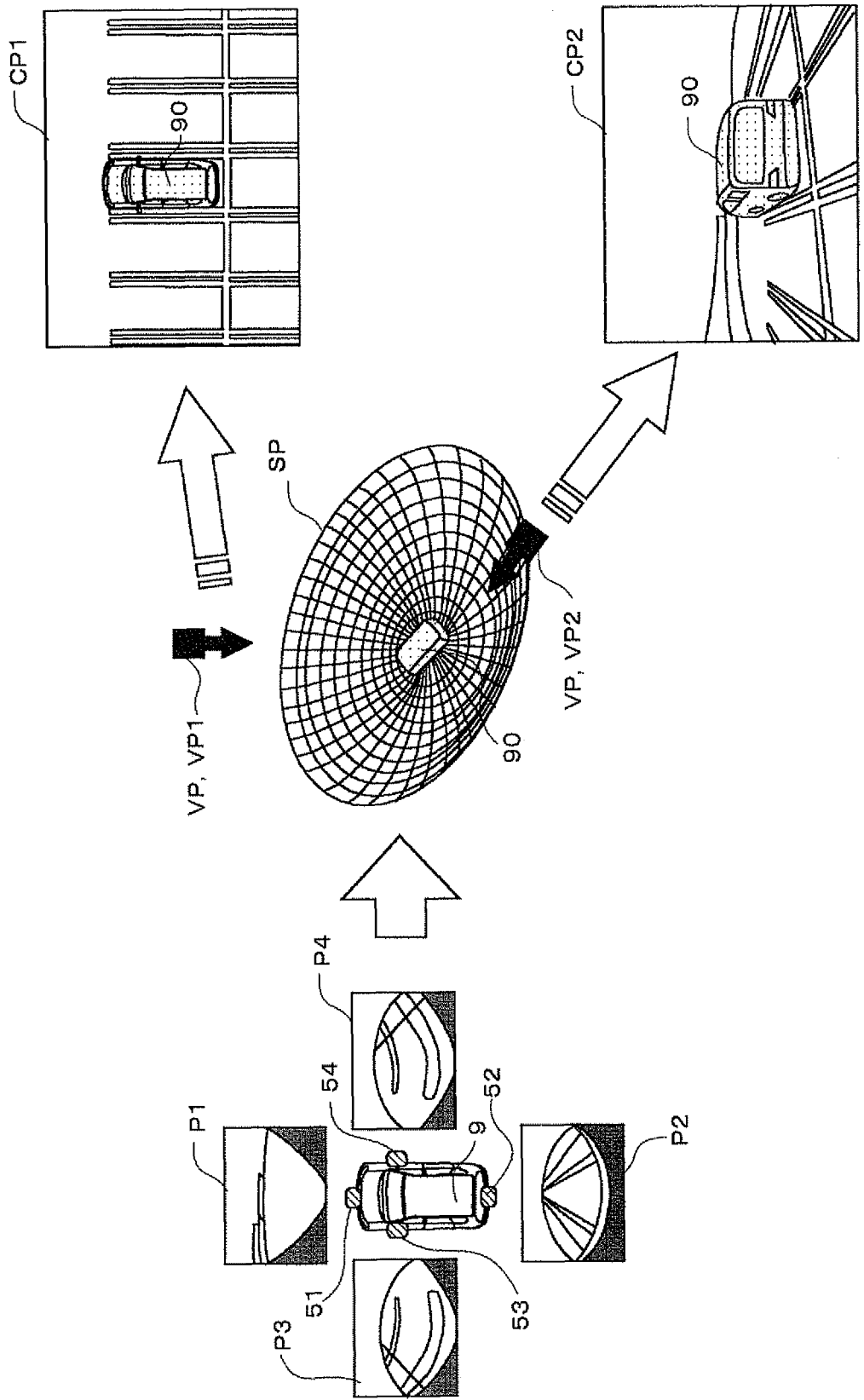
FIG. 4 is a diagram for explaining a method for generating a composite image.

Next explained is a method where the composite-image generator 32 of the image generator 3 generates a composite image that shows the situation around the vehicle viewed from an arbitrary virtual viewpoint, based on a plurality of shot images acquired with the image-shooting part 5. The vehicle model data 4*a* stored beforehand in the nonvolatile memory 40 is used to generate the composite image. FIG. 4 is a diagram for explaining the method for generating the composite image.

When the four on-vehicle cameras 51, 52, 53 and 54 of the image-shooting part 5 shoot images simultaneously, a shot image P1 showing a region in front of the vehicle 9 is shot by the front camera 51, a shot image P2 showing a region behind the vehicle 9 is shot by the rear camera 52, a shot image P3 showing a region outside a left lateral side of the vehicle 9 is shot by the left side camera 53, and a shot image P4 showing a region outside a right lateral side of the vehicle 9 is shot by the right side camera 54. Information showing the surroundings entirely around the vehicle 9 at a moment of shooting the images is included in those shot images P1, P2, P3 and P4.

Then, each pixel of the four shot images P1, P2, P3 and P4 is projected onto a three-dimensional (3D) curved surface SP in virtual 3D space. The 3D curved surface SP is, for example, approximately hemispherical (bowl-shaped). The vehicle 9 is defined to be located in a center thereof (a bottom of the bowl). A correspondence relation between positions of individual pixels included in the shot images P1, P2, P3 and P4 and positions of individual pixels included in the 3D curved surface SP is predetermined. Therefore, values of the individual pixels of the 3D curved surface SP can be determined based on the correspondence relation and values of the individual pixels included in the shot images P1, P2, P3 and P4.

The correspondence relation between the positions of the individual pixels included in the shot images P1, P2, P3 and P4 and the positions of the individual pixels included in the 3D curved surface SP depends on disposition (mutual distances, heights above the ground, and angles of light axes, etc.) of the four on-vehicle cameras 51, 52, 53 and 54. Therefore, table data indicative of the correspondence relation is included in the vehicle model data 4*a* stored in the nonvolatile memory 40.

Moreover, polygon data indicative of a vehicle shape and a vehicle size included in the vehicle model data 4*a* is used to virtually configure a vehicle image 90 that is a polygon model showing a 3D shape of the vehicle 9. The vehicle image 90 configured is disposed in a center of the approximately hemispherical shape where the vehicle 9 is defined to be located, in the 3D space having the 3D curved surface SP.

A virtual viewpoint VP is set in the 3D space having the 3D curved surface SP by the image controller 11 of the control part 1. The virtual viewpoint VP is defined by a viewpoint location and a direction of a visual field, and is set at an arbitrary viewpoint location relating to the surroundings of the vehicle 9 in the 3D space, having the visual field directed in an arbitrary direction.

In accordance with the virtual viewpoint VP being set, a necessary region of the 3D curved surface SP is clipped as an image. A relation between the virtual viewpoint VP and the necessary region of the 3D curved surface SP is predetermined, and is stored beforehand in the nonvolatile memory 40, etc. as table data. Meanwhile, in accordance with the virtual viewpoint VP being set, the vehicle image 90 converted into two dimensions (2D), as a result of rendering of the vehicle image 90 configured by polygons, is superimposed on the image clipped. Accordingly, the composite image showing the vehicle 9 and the situation around the vehicle 9 viewed from the arbitrary virtual viewpoint is generated.

For example, when a virtual viewpoint VP1 is set at a viewpoint location directly above an approximately center portion of the vehicle 9 having the visual field directed in an approximately straight downward direction, a composite image (downward view image) CP1 is generated to show the vehicle 9 (actually the vehicle image 90) and the situation around the vehicle 9 viewed downward from approximately directly above the vehicle 9. Moreover, as shown in the drawing, when a virtual viewpoint VP2 is set at a viewpoint location on a left side behind the vehicle 9 having the visual field directed in an approximately frontward direction, a composite image CP2 is generated to show a panoramic view of the vehicle 9 (actually the vehicle image 90) and the situation around the vehicle 9 viewed from the left side behind the vehicle 9.

Actually, the values of all the pixels of the 3D curved surface SP do not have to be determined when the composite image is generated. The process speed can be improved by determining, based on the shot images P1, P2, P3 and P4, values of pixels of only a region required to generate the composite image in accordance with the virtual viewpoint VP being set.

<1-4. Illumination by Auxiliary Lighting System, Etc>

Figure 5:
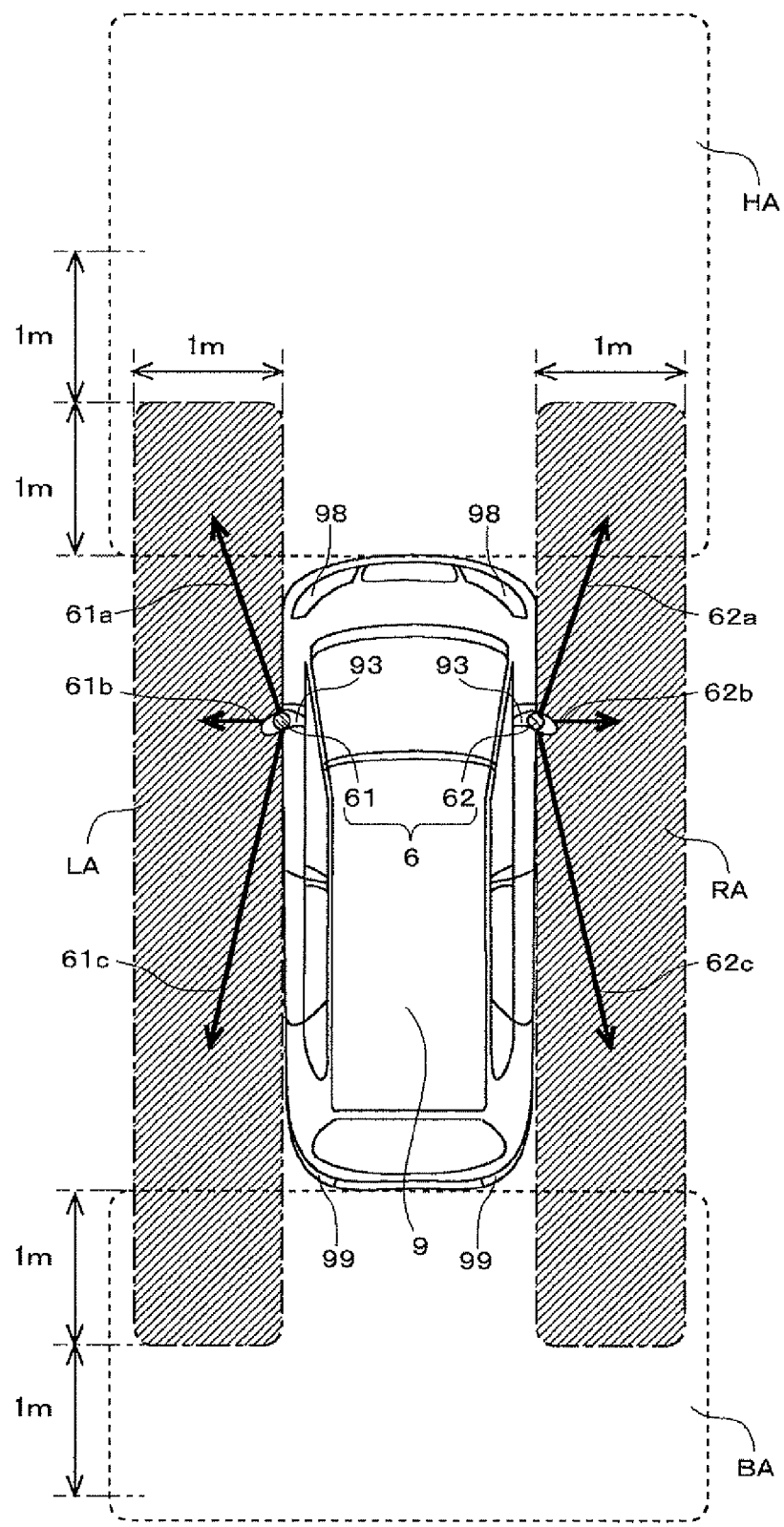
FIG. 5 shows regions around a vehicle that lights such as an auxiliary light can illuminate.

Next, a range of a region around the vehicle that the auxiliary lighting system 6 can illuminate is described. FIG. 5 shows the region around the vehicle 9 that the auxiliary lighting system 6, etc. can illuminate. As cited above, the auxiliary lighting system 6 includes the left lighting part 61 and the right lighting part 62. The left lighting part 61 and the right lighting part 62 respectively include three auxiliary light sources.

The left lighting part 61 is disposed on the side mirror 93 on the left side of the vehicle 9. An optical axis 61a of one of the three auxiliary light sources of the left lighting part 61 is directed in a frontward direction of the vehicle 9, an optical axis 61b of one of the three auxiliary light sources is directed in a left direction of the vehicle 9, and an optical axis 61c of one of the three auxiliary light sources is directed in a backward direction. As a result, the left lighting part 61 illuminates a lateral region LA extending backward from a front of the vehicle 9 on the left outside of the vehicle 9. The lateral region LA is a region having a length from approximately one meter ahead of the front edge of the vehicle 9 to approximately one meter behind the rear edge of the vehicle 9 in a front-back direction, and having a width of up to approximately one meter outward from the left lateral side of the vehicle 9 in the horizontal direction.

The right lighting part 62 is disposed on the side mirror 93 on the right side of the vehicle 9. A region that the right lighting part 62 can illuminate is symmetrical to the region that the left lighting part 61 can illuminate with respect to the vehicle 9. In other words, an optical axis 62a of one of the three auxiliary light sources of the right lighting part 62 is directed in the forward direction of the vehicle 9, an optical axis 62b of one of the three auxiliary light sources is directed in a right direction of the vehicle 9, and an optical axis 62c of one of the three auxiliary light sources is directed in the backward direction. As a result, the right lighting part 62 illuminates a right lateral region RA extending backward from a front of the vehicle 9 on the right outside of the vehicle 9. The lateral region RA is a region having a length from approximately one meter ahead of the front edge of the vehicle 9 to approximately one meter behind the rear edge of the vehicle 9 in the front-back direction, and having a width of up to approximately one meter outward from the right lateral side of the vehicle 9 in the horizontal direction.

As described above, the lateral regions LA and RA of the vehicle 9 are illuminated by the auxiliary lighting system 6. A region in front of the vehicle 9 and a region behind the vehicle 9 can be illuminated by the lighting system for driving (headlights 98 and taillights 99).

The headlights 98 of the vehicle 9 illuminate a frontward region HA of the vehicle 9. The frontward region HA shown in the drawing is a region able to be illuminated by the headlights 98 so that so that a subject image of an object in the frontward region HA is shot with sufficient brightness (e.g., 0.5 lux or more) even when the surrounding environment is dark. The frontward region HA has a length of two meters or more frontward from the front edge of the vehicle 9 in the front-back direction and has a width of one meter or more outward respectively from the left lateral side and from the right lateral side of the vehicle 9 in the horizontal direction.

The taillights 99 of the vehicle 9 illuminate a backward region BA of the vehicle 9. The backward region BA shown in the drawing is a region able to be illuminated by the taillights 99 so that so that a subject image of an object in the backward region BA is shot with sufficient brightness (e.g., 0.5 lux or more) even when the surrounding environment is dark The backward region BA has a length of two meters or more backward from the rear edge of the vehicle 9 in the front-back direction and has a width of one meter or more outward respectively from the left lateral side and from the right lateral side of the vehicle 9 in the horizontal direction.

The regions LA, RA, HA and BA around the vehicle 9 can be illuminated as described above. As a result, a region entirely around the vehicle 9, up to one meter outward respectively from the front edge, the rear edge, the left lateral side and the right lateral side of the vehicle 9, can be illuminated. An object in the regions LA, RA, HA and BA is shot as a subject image having sufficient brightness in an image even when the surrounding environment is dark. On the other hand, an object outside the regions LA, RA, HA and BA is not shot as a subject image having sufficient brightness in an image when the surrounding environment is dark. When such a subject image is displayed on the display 21, visibility of the subject image is poor.

<1-5. Image Display Range>

In order to prevent such a subject image having poor visibility from being displayed, the image controller 11 of the image display system 120 differentiates a range of the region around the vehicle depending on whether or not the auxiliary lighting system 6 is emitting light.

Figure 6:
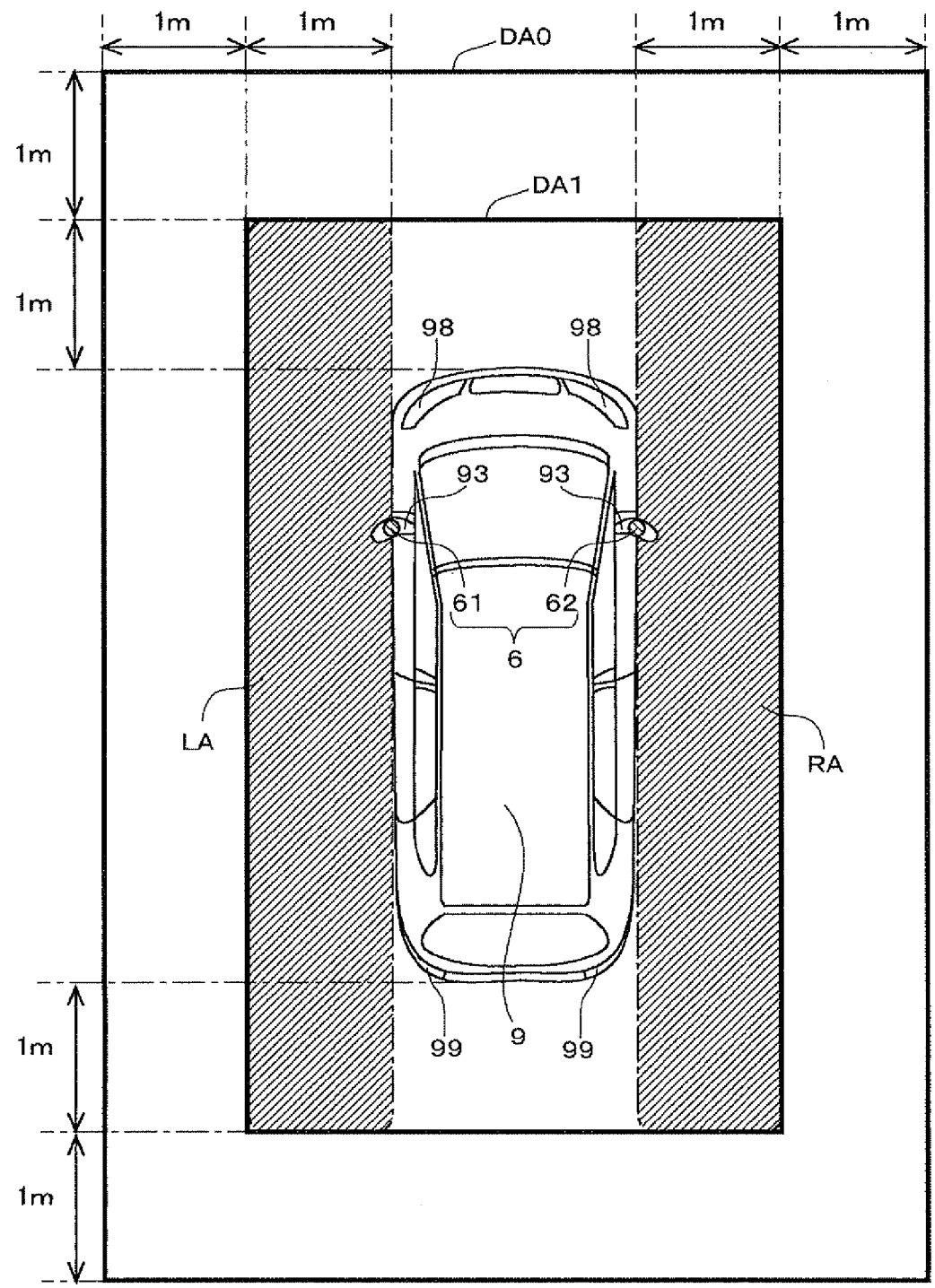
FIG. 6 shows an example of an image display range.

FIG. 6 shows ranges of regions around the vehicle to be shown as a subject image in a composite image (hereinafter referred to as "image display range") DA0 and DA1. Such image display ranges DA0 and DA1 are predetermined, and data for defining the image display ranges DA0 and DA1 is included in the display range data 4b.

An image display range is the normal image display range DA0 shown in the drawing in a case where the auxiliary lighting system 6 does not emit light. The normal image display range DA0 is a region up to two meters outward respectively from the front edge, the rear edge, the left lateral side and the right lateral side of the vehicle 9.

On the other hand, the light-emission image display range DA1 shown in the drawing is an image display range in a case where the auxiliary lighting system 6 emits light and is smaller than the normal image display range DA0. The light-emission image display range DA1 is a region up to one meter outward respectively from the front edge, the rear edge, the left lateral side and the right lateral side of the vehicle 9. The light-emission image display range DA1 is set on the basis of the lateral regions LA and RA that are the ranges able to be illuminated by the auxiliary lighting system 6. Concretely, a left edge of the light-emission image display range DA1 is set to match a left edge of the lateral region LA, and a right edge of the light-emission image display range DA1 is set to match a right edge of the lateral region RA. Moreover, a front edge of the light-emission image display range DA1 is set to match a front edge of the lateral regions LA and RA and a back edge of the light-emission image display range DA1 is set to match a back edge of the lateral regions LA and RA. As a result, the light-emission image display range DA 1 includes the lateral regions LA and RA, but excludes a region outside the lateral regions LA and RA.

Figure 7:
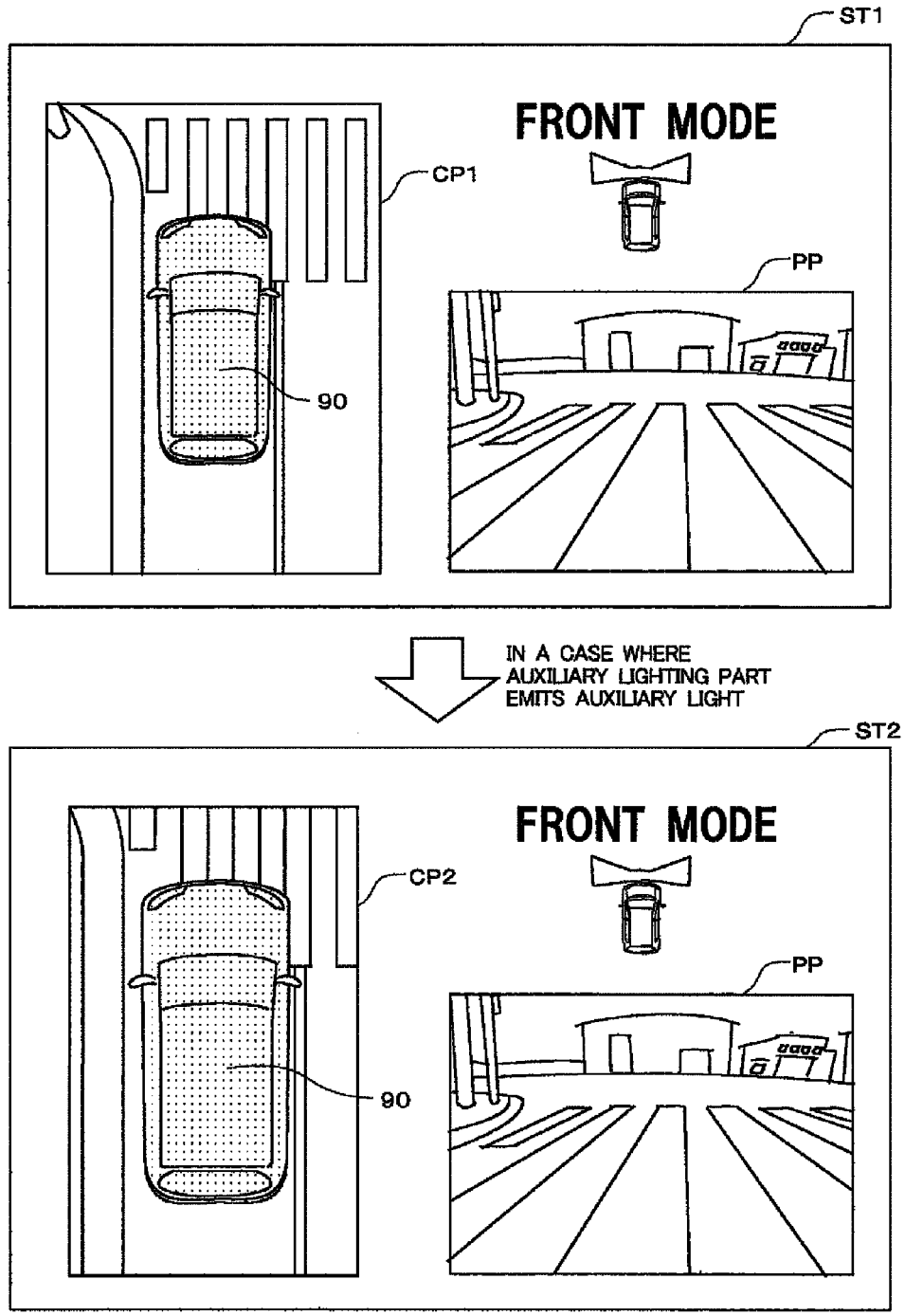
FIG. 7 shows an example of a composite image displayed on a display.

The setting of the image display ranges as described above allows a relatively broad range of the region around the vehicle to be shown as the subject image in the composite image CP1, as shown in an upper section of FIG. 7, in the case where the auxiliary lighting system 6 does not emit light. On the other hand, in the case where the auxiliary lighting system 6 emits light due to the dark surrounding environment, a range of the region shown as the subject image in the composite image CP2, as shown in a lower section of FIG. 7, is smaller than that in the case where the auxiliary lighting system 6 does not emit light.

Therefore, an object in a region other than the regions LA, RA, HA and BA (refer to FIG. 5) able to be illuminated is not displayed on the display 21 as the subject image in the composite image CP2. As a result, a subject image having poor visibility is not displayed on the display 21, which prevents the user (typically the driver) from trying to recognize the subject image having poor visibility.

As shown in FIG. 7, a screen size of the composite image generated in the case where the auxiliary lighting system 6 emits light is the substantially same as a size of the composite image generated in the case where the auxiliary lighting system 6 does not emit light. Therefore, the subject image in the composite image generated in the case where the auxiliary lighting system 6 emits light is greater than the subject image in the composite image generated in the case where the auxiliary lighting system 6 does not emit light. Accordingly, the visibility of the subject image shown in the composite image is improved.

<1-6. Process Procedure>

Figure 8:
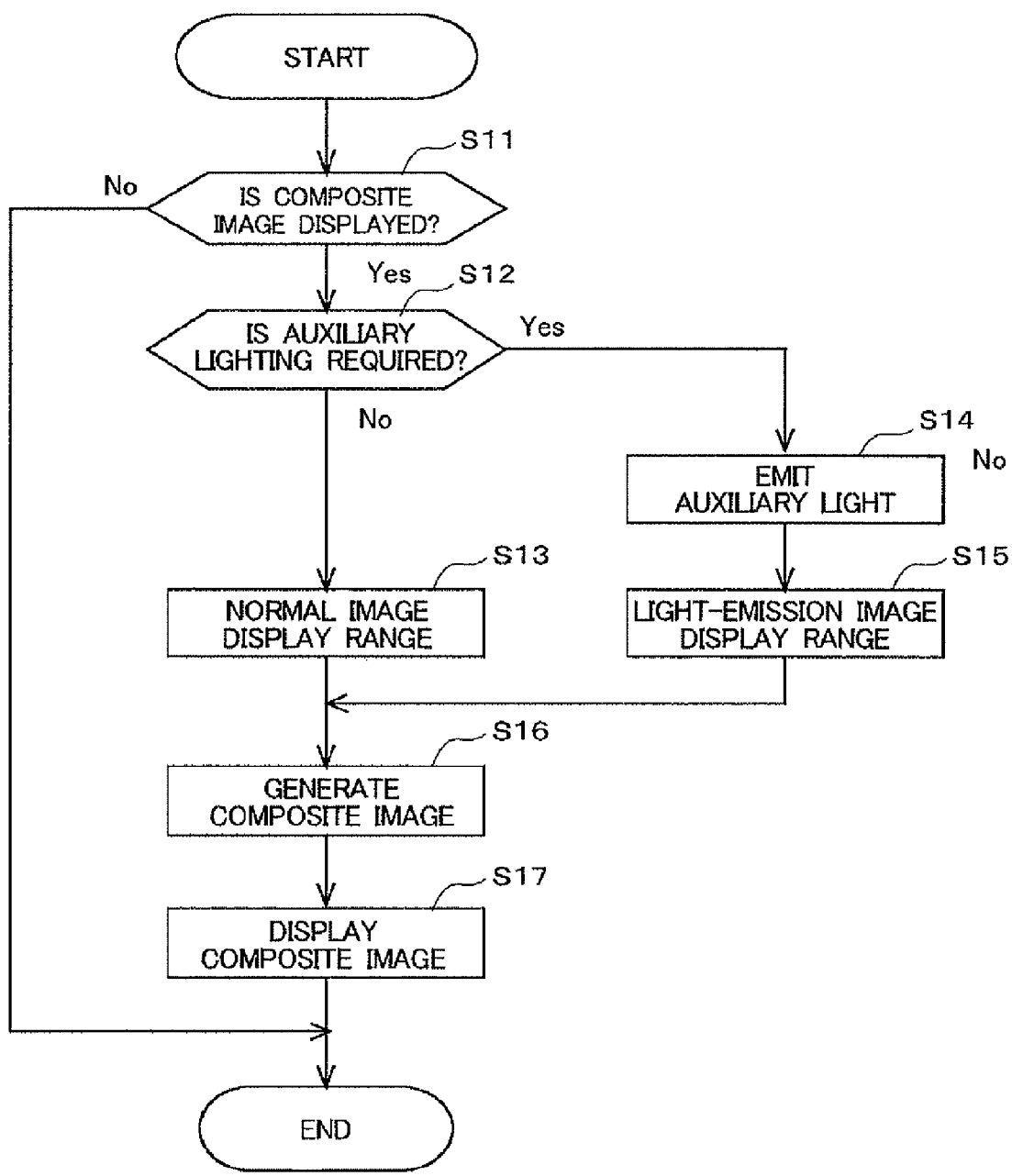
FIG. 8 is a flow diagram for displaying a composite image on a display.

Next explained is a process procedure in which the image display system 120 changes the image display range in accordance with a lighting state of the auxiliary lighting system 6. FIG. 8 is a flow diagram showing process procedure in which the image display system 120 displays a composite image on the display 21. The process is conducted repeatedly by control of the control part 1.

First, it is determined whether the vehicle 9 is in a state where a composite image showing the situation around the vehicle 9 should be displayed on the display 21 (a step S11). Concretely, it is determined whether the image display system 120 is in the operation mode of the front mode M2 or the back mode M3. When the image display system 120 is in the navigation mode M1 (No in the step S11) which does not display the composite image, the process ends.

When the image display system 120 is in the operation mode of the front mode M2 or the back mode M3 (Yes in the step S11), the lighting controller 12 determines whether or not brightness around the vehicle is at a level that requires the illumination of the auxiliary lighting system 6. Concretely, using average brightness of a shot image acquired with the image-shooting part 5, it is determined whether or not the average brightness is equal to or below a predetermined threshold value. When the average brightness is equal to or below the predetermined threshold value, it is determined that the illumination of the auxiliary lighting system 6 is required.

However, an illuminance sensor that detects illuminance around the vehicle may be provided to use a result detected by the illuminance sensor as a value showing the brightness around the vehicle. Moreover, based on a signal from the lighting control apparatus 84, which represents an illuminating state of a lighting system, it may be determined whether or not the illumination of the auxiliary lighting system 6 is required. For example, when the headlights 98 are on, it is dark around a vehicle, generally. In such a case, it may be determined that the illumination of the auxiliary lighting system 6 is required.

When the illumination of the auxiliary lighting system 6 is not required (No in a step S12), the image display range is set to the normal image display range DA0 (refer to FIG. 6) by the image controller 11 (a step S13).

On the other hand, when the illumination of the auxiliary lighting system 6 is required (Yes in a step S12), the auxiliary light is first emitted from the auxiliary lighting system 6 by the control of the lighting controller 12 (a step S14). Meanwhile the image display range is set to the light-emission image display range DA1 (refer to FIG. 6) that is smaller than the normal image display range DA0, by the image controller 11 (a step S15).

The image display range is set as described above. Then a composite image is generated in accordance with the image display range being set (a step S16). The composite image generated is adjusted to serve as an image for display and is displayed on the display 21 (a step S17).

As cited above, the image display system 120 that is an embodiment of this invention makes the image display range that is a range of the region around the vehicle to be shown as the subject image in the composite image, in the case where the auxiliary lighting system 6 emits light, smaller than that in the case where the auxiliary lighting system 6 does not emit light. Therefore, a region not illuminated by the auxiliary lighting system 6 is reduced in the image display range. As a result, the number of times when the user has to watch the subject image having poor visibility can be reduced.

In addition, since the image display range is set on the basis of a range that the auxiliary lighting system 6 can illuminate in the case where the auxiliary lighting system 6 emits light, a range which is bright enough to identify the subject image can be set as the image display range. Accordingly, visibility of the subject image to be shown in the composite image can be improved.

Moreover, the visibility of the subject image is improved further in the case where the auxiliary lighting system 6 emits light because the subject image in the composite image is greater than that in the case where the auxiliary lighting system 6 does not emit light.

<2. Second Embodiment>

Next, a second embodiment is explained. The image display system of the second embodiment is almost the same in the structure and the procedure as the first embodiment, but is partly different from the first embodiment. Therefore, differences from the first embodiment are mainly explained hereinbelow. In the first embodiment, both the left lighting part 61 and the right lighting part 62 emit light approximately simultaneously. However, in the second embodiment, it is possible to switch to an illuminating state where only a left lighting part 61 is emitting light. A press of an operation switch 43 can switch between an illuminating state where both the left lighting part 61 and a right lighting part 62 are emitting light and the illuminating state where only the left lighting part 61 is emitting light (hereinafter referred to as "a left lighting part 61-illuminating state").

Figure 9:
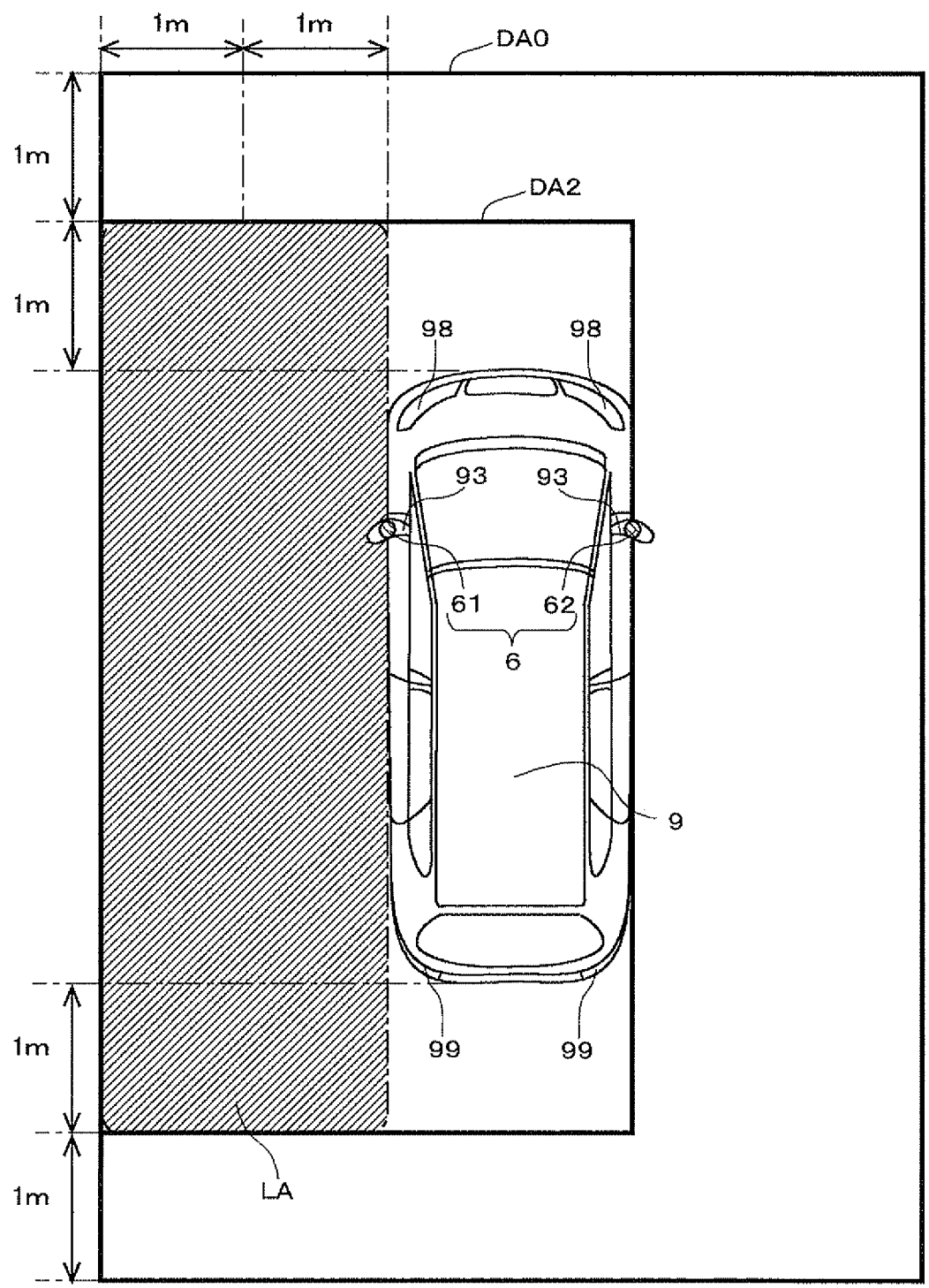
FIG. 9 shows another example of an image display range.

FIG. 9 shows a region around a vehicle 9 that can be illuminated by the left lighting part 61 in the left lighting part 61-illuminating state. A region around the vehicle 9 that can be illuminated in the illuminating state where both the left lighting part 61 and the right lighting part 62 are emitting light (hereinafter referred to as "both lighting parts-illuminating state") is the same as the region shown in FIG. 5.

Generally, there is a limit to a total amount of an electric current flowing through an auxiliary lighting system 6. In the both lighting parts-illuminating state, it is required that the total amount of the electric currents flowing through the left lighting part 61 and flowing through the right lighting part 62 should be equal to or below the limit. On the other hand, in the left lighting part 61-illuminating state, only the electric current flowing through the left lighting part 61 is required to be equal to or below the limit. Therefore, a relatively large electric current can flow through the left lighting part 61. An amount of an auxiliary light emitted from an auxiliary light source depends on an amount of an electric current that flows through the auxiliary light source. Therefore, an amount of the auxiliary light emitted from the left lighting part 61 in the left lighting part 61-illuminating state can be larger than that in the both lighting parts-illuminating state.

For that reason, in this embodiment, a left lateral region LA able to be illuminated by the left lighting part 61 is larger in the left lighting part 61-illuminating state than that in the both lighting parts-illuminating state. Concretely, as shown in FIG. 9, the lateral region LA is a region up to approximately two meters outward from the left lateral side of the vehicle 9 in the horizontal direction. In this case, a right lateral region RA that is illuminated by the right lighting part 62 does not exist.

Moreover, since a range of the lateral region LA able to be illuminated by the left lighting part 61 is larger as described above, an image display range is changed to fit the lateral region LA in the left lighting part 61-illuminating state. In other words, the image display range in the left lighting part 61-illuminating state is a left light-emission image display range DA2 shown in the drawing. A left edge of the left light-emission image display range DA2 is set to match a left edge of the lateral region LA, and a right edge of the left light-emission image display range DA2 is set to match a right lateral side of the vehicle 9. A size of the left light-emission image display range DA2 is smaller than a size of a normal image display range DA0 and is the same as a size of a light-emission image display range DA1 (refer to FIG. 6).

Figure 10:
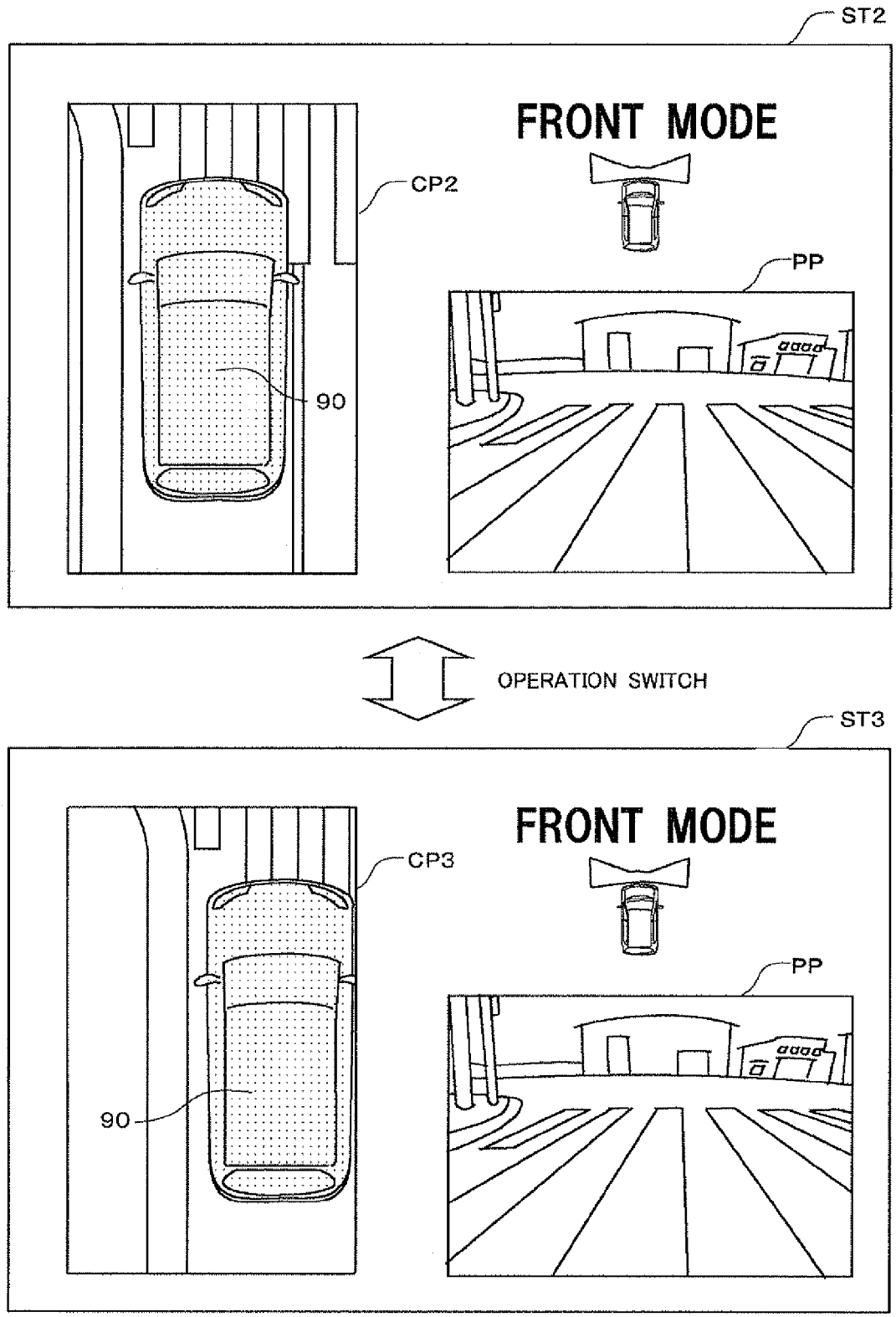
FIG. 10 shows an example of a composite image displayed on a display.

As shown in an upper section of FIG. 10, in the both lighting parts-illuminating state, a panoramic view of a region around the vehicle is shown as a subject image in a composite image CP2. On the other hand, in the left lighting part 61-illuminating state, as shown in lower section of FIG. 10, a relatively large range on a left side of the vehicle that is a direction in which the left lighting part 61 emits light is shown as the subject image in a composite image CP3.

As described above, in this embodiment, in the left lighting part 61-illuminating state, visibility of the subject image of an object located in a direction in which the left lighting part 61 emits light is improved because the image display range is set on the basis of the range that the left lighting part 61 being emitting light can illuminate.

This embodiment has explained a state where the left lighting part 61 independently emits light. However, the lighting state may be switched to a state where the right lighting part 62 independently emits light. It is preferable to be switchable to a state where the left lighting part 61 or the right lighting part 62 independently illuminates an object which tends to become blind spot due to its location of opposite side of the driver seat. In the state where the right lighting part 62 independently emits light, an image display range may be set in the same manner as cited above, on the basis of a range that the right lighting part 62 being emitting light can illuminate.

<3. Modification Example>

Hereinbefore, the embodiments of this invention have been described. However, this invention is not limited to the aforementioned embodiments, but various modifications are possible. Hereinbelow, such modifications will be explained. Each of all embodiments including the embodiments described above and below can be arbitrarily combined with one or more of the others.

Figure 11:
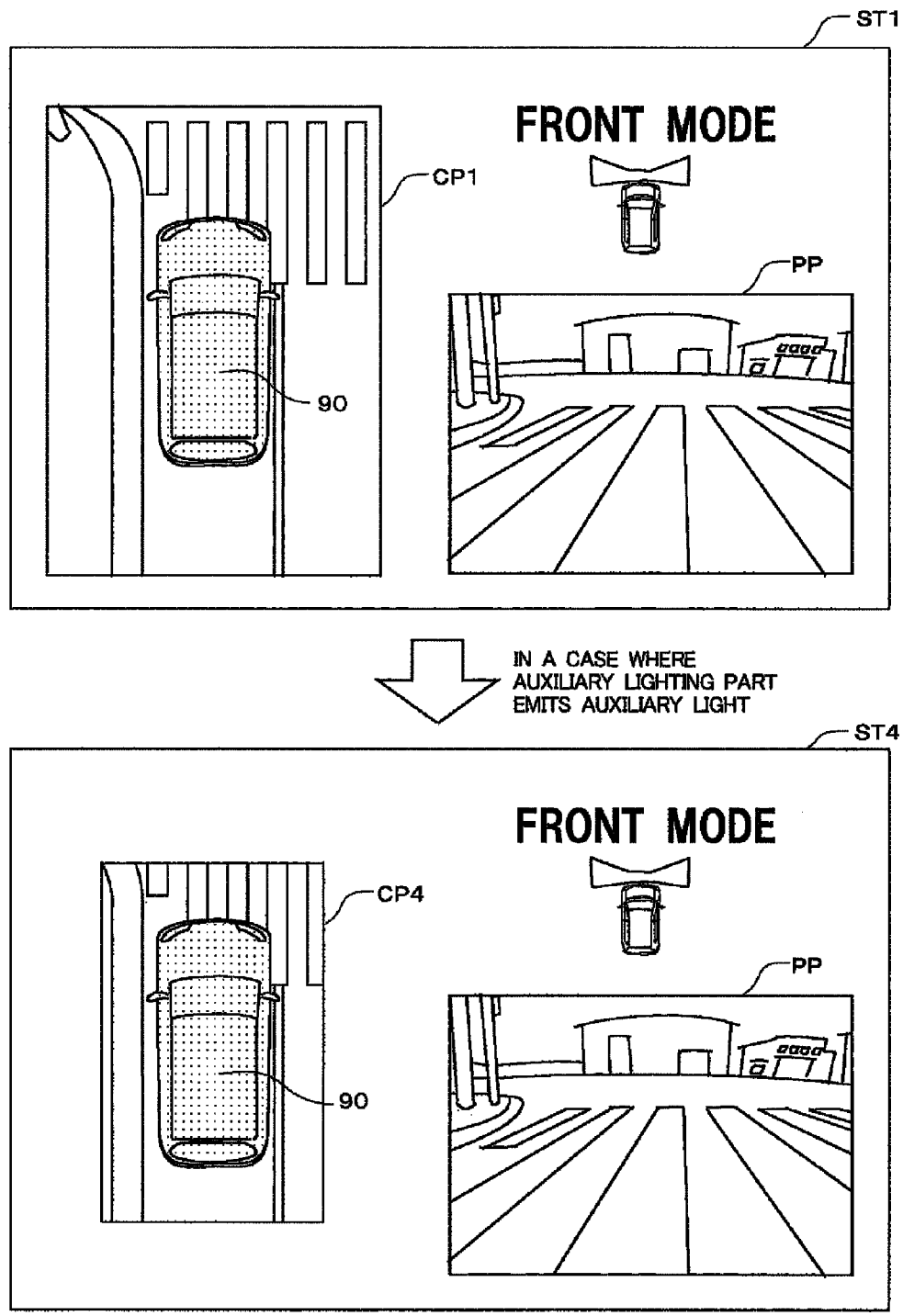
FIG. 11 shows an example of a composite image displayed on a display.

In the aforementioned embodiments, in the case where the auxiliary lighting system 6 emits light, the subject image in the composite image is made greater than that in the case where the auxiliary lighting system 6 does not emit light. On the other hand, as shown in FIG. 11, a size of the subject image in a composite image CP1 in a state where the auxiliary lighting system 6 does not emit light (an upper section of FIG. 11) may be the same as a size of a subject image in a composite image CP4 in a state where the auxiliary lighting system 6 emits light (a lower section of FIG. 11).

Figure 12:
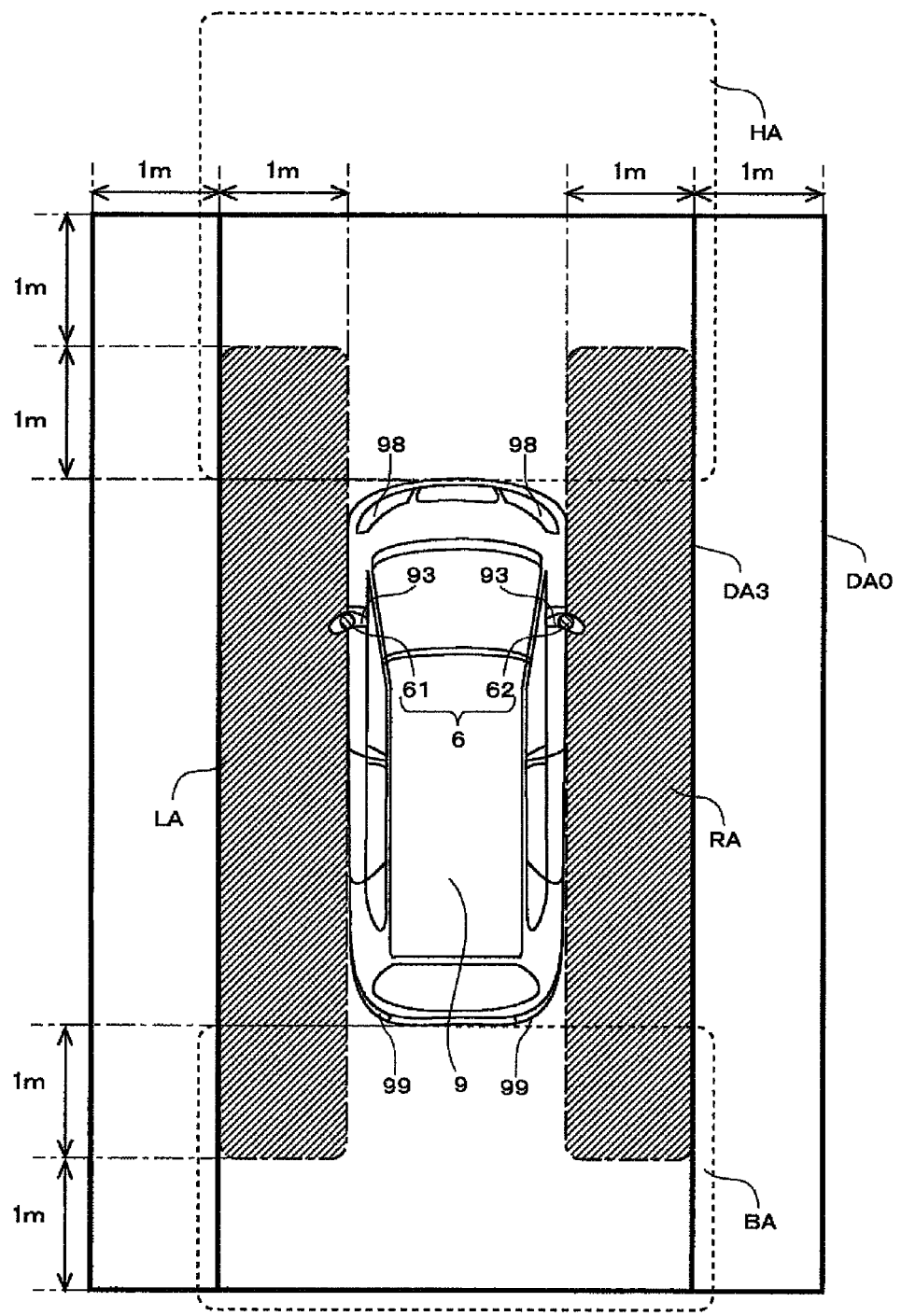
FIG. 12 shows another example of an image display range.
Figure 13:
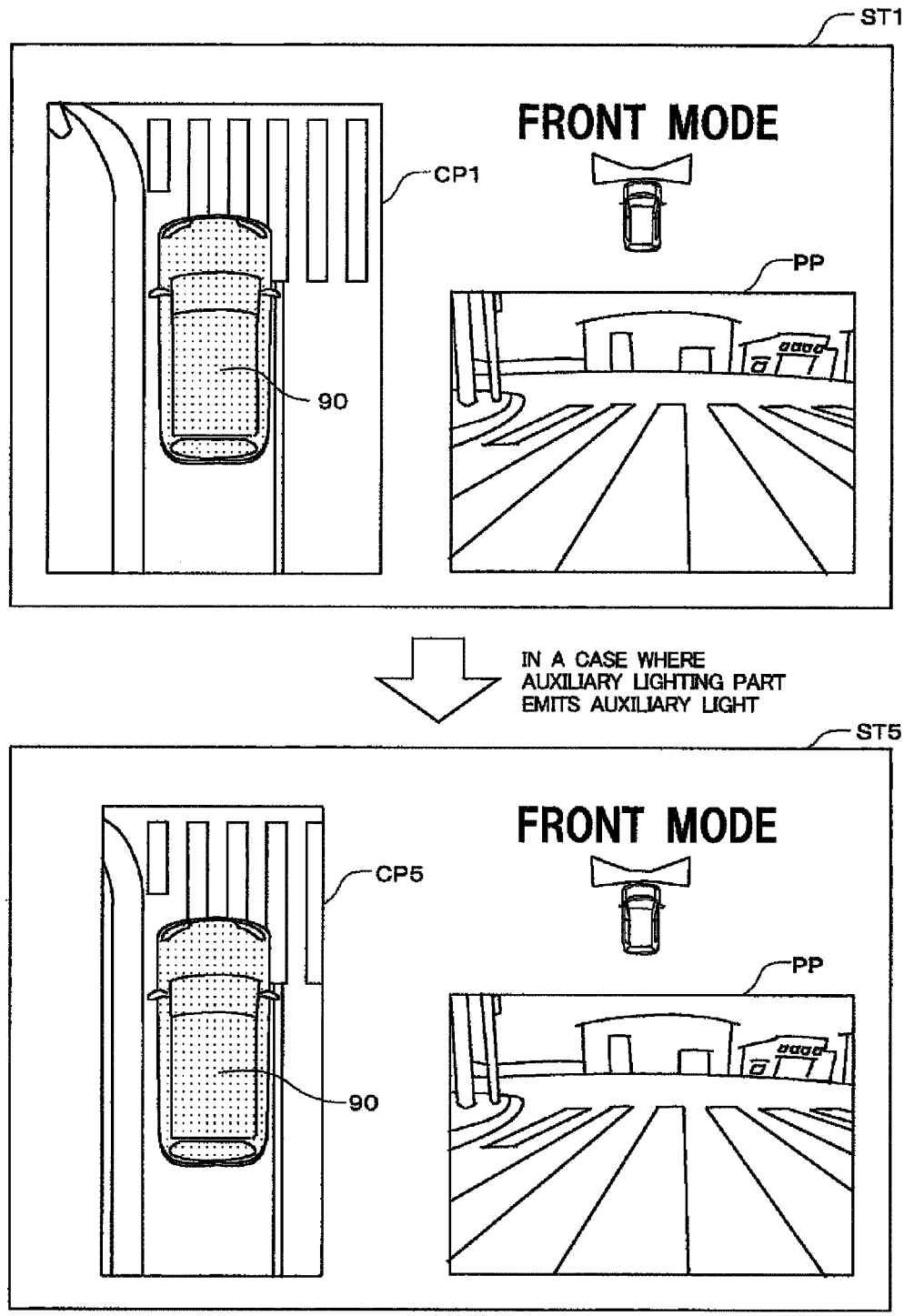
FIG. 13 shows an example of a composite image displayed on a display.

In the aforementioned embodiments, as for a front-back direction of the vehicle 9, the image display range in the state where the auxiliary lighting system 6 emits light are set in accordance with the lateral regions LA and RA that are the ranges that the auxiliary lighting system 6 can illuminate. However, the lighting system for driving can illuminate a region two meters or more frontward from the front edge of the vehicle 9 or backward from the rear edge of the vehicle 9. As a result, there are relatively fewer needs that the image display range is set in accordance with the lateral regions LA and RA for the front-back direction. Therefore, as shown in FIG. 12, the image display range in the state where the auxiliary lighting system 6 emits light may be set to an image display range DA3 of which a left edge matches the left edge of the lateral region LA and of which a right edge matches the right edge of the lateral region RA. In this case, as shown in FIG. 13, a region shown as a subject image in a composite image CP5 in the case where the auxiliary lighting system 6 emits light (a lower section of FIG. 13) is narrower in the horizontal direction than that in the case where the auxiliary lighting system 6 does not emit light (a upper section of FIG. 13).

In the case where the auxiliary lighting system 6 emits light, the image display range may be switched between the light-emission image display range DA1 shown in FIG. 6 and the image display range DA3 shown in FIG. 12, in accordance with an illuminating state of a lighting system represented by a signal from a lighting control apparatus 84. Concretely, in a case where headlights 98 and taillights 99 emit light, the image display range DA3 shown in FIG. 12 is set as the image display range because a frontward region HA and a backward region BA of the vehicle 9 are illuminated. On the other hand, in a case where the headlights 98 and the taillights 99 do not emit light, the light-emission image display range DA1 shown in FIG. 6 may be set as the image display region.

Moreover, in the aforementioned embodiments, the composite image displayed on the display 21 is a downward view image viewed from a virtual viewpoint directly above the vehicle 9. However, a location of the virtual viewpoint is not limited to a point directly above the vehicle 9, and may be at another point such as at a point behind the vehicle 9. Even when the virtual viewpoint is a point other than a point directly above the vehicle 9, the image display range that is a range of the region around the vehicle 9 shown as a subject image in a composite image in the case where the auxiliary lighting system 6 emits light, can be made smaller than that in the case where the auxiliary lighting system 6 does not emit light.

Moreover, it is also acceptable to simply make the image display range in the case where the auxiliary lighting system 6 emits light smaller than that in the case where the auxiliary lighting system 6 does not emit light, instead of matching the image display range to the range able to be illuminated by the auxiliary lighting system 6. Even in such a case, the number of times when the user has to watch the subject image having poor visibility can be reduced.

In the aforementioned embodiments, the image generation apparatus 100 is described to be an apparatus separate from the navigation apparatus 20. However, the image generation apparatus 100 and the navigation apparatus 20 may be disposed in a single housing to be configured as a combined apparatus.

Moreover, in the aforementioned embodiments, the navigation apparatus 20 is described as the display apparatus for display of an image generated by the image generation apparatus 100. However, the image generated by the image generation apparatus 100 may be displayed on a general display apparatus not equipped with a special function such as a navigation function.

Furthermore, a part of functions implemented by the control part 1 of the image generation apparatus 100 in the aforementioned embodiments may be implemented by the control part 23 of the navigation apparatus 20.

In addition, a part or all of signals received by the signal receiver 41 in the aforementioned embodiments may be received by the navigation apparatus 20. In this case, the signals received by the navigation apparatus 20 are further received by a navigation communication part 42 and are input into a control part 1 of the image generation apparatus 100.

Moreover, in the aforementioned embodiments, it is explained that various functions are implemented by software performance by arithmetic processing of a CPU in accordance with a program. However, a part of these functions may be implemented by electric hardware circuitry. Contrarily, a part of the functions are implemented by electric hardware circuitry may be implemented by software.

While the invention has been shown and described in detail, the foregoing description is in all aspects illustrative and not restrictive. It is therefore understood that numerous other modifications and variations can be devised without departing from the scope of the invention.

What is claimed is:

1. An image generation apparatus that generates an image to be displayed on a display apparatus installed in a vehicle, the image generation apparatus comprising:
    an image generator that generates a composite image viewed from a virtual viewpoint, on the basis of shot images acquired by shooting surroundings of the vehicle with a plurality of cameras;
    a lighting system that emits auxiliary light for assisting the plurality of cameras in shooting; and
    a controller that includes an image controller and a lighting controller, wherein in a case where the controller controls the lighting controller to make the lighting system emit the auxiliary light, the controller controls the image controller to make an image display range smaller than the image display range in a case where the lighting system does not emit the auxiliary light, and
    the image display range is a range of a region around the vehicle to be shown in the composite image.

2. The image generation apparatus according to claim 1, wherein
    the image controller sets the image display range on the basis of a range that the lighting system is capable of illuminating in the case where the lighting controller makes the lighting system emit the auxiliary light.

3. The image generation apparatus according to claim 2, wherein
    the lighting system includes light sources disposed on each of a left side and a right side of the vehicle,
    the image generation apparatus further comprises a switching part capable of switching from a state where the light sources on both the left side and the right side are emitting the auxiliary light to a state where one of the light sources on either the left side or the right side is emitting the auxiliary light, and wherein
    the image controller sets the image display range, when in the state in which one of the light sources on either the left side or the right side is emitting auxiliary light, on the basis of a range that the one of the light sources is capable of illuminating.

4. The image generation apparatus according to claim 1, wherein
    in the case where the Lighting controller makes the lighting system emit the auxiliary light, the image controller makes a subject image shown in the composite image larger than the subject image in the case where the lighting controller does not make the lighting system emit the auxiliary light.

5. The image generation apparatus according to claim 1, wherein the image controller reduces a region of the image display range that is not illuminated by the auxiliary lighting system.

6. An image display system for installation in a vehicle, the image display system comprising:
    an image generator that generates a composite image viewed from a virtual viewpoint, on the basis of shot images acquired by shooting surroundings of the vehicle with a plurality of cameras;
    a lighting system that emits auxiliary light for assisting the plurality of cameras in shooting;
    a controller that includes an image controller and a lighting controller, wherein in a case where the controller controls the lighting controller to make the lighting system emit the auxiliary light, the controller controls the image controller to make an image display range smaller than the image display range in a case where the lighting system does not emit the auxiliary light, and
    the image display range is a range of a region around the vehicle to be shown in the composite image, and
    the image display system further comprises a display apparatus that displays the composite image generated by the image generator.

7. An image generation method for generating an image to be displayed on a display apparatus installed in a vehicle, the image generation method comprising the steps of:
    (a) generating a composite image viewed from a virtual viewpoint, on the basis of shot images acquired by shooting surroundings of the vehicle with a plurality of cameras;
    (b) controlling the emission of auxiliary light from a lighting system for assisting the plurality of cameras in shooting; and
    (c) in a case where the lighting system is controlled to emit the auxiliary light, making an image display range smaller than the image display range in a case where the lighting system does not emit the auxiliary light, wherein
    the image display range is a range of a region around the vehicle to be shown in the composite image.

8. The image generation method according to claim 7, wherein
    the step (c) sets the image display range on the basis of a range that the lighting system is capable of illuminating in the case where the lighting system is controlled to emit the auxiliary light.

9. The image generation method according to claim 8, wherein
    the lighting system includes light sources disposed on each of a left side and on a right side of the vehicle,
    the image generation method further comprises the step of (d) switching from a state where the light sources on both the left side and the right side are emitting the auxiliary light to a state where one of the light sources on either the left side or on the right side is emitting the auxiliary light, and wherein
    the step (c) sets the image display range, when in the state in which one of the light sources on either the left side and the right side is emitting the auxiliary light, on the basis of a range that the one of the light sources is capable of illuminating.

10. The image generation method according to claim 7, wherein the step (c) makes a subject image shown in the composite image in the case where the lighting system is controlled to emit the auxiliary light larger than the subject image in the case where the lighting system does not emit the auxiliary light.

11. The image generation method according to claim 7, wherein

The step (c) reduces a region of the of the image display range that is not illuminated by the auxiliary lighting system.

* * * * *